JOHN J. YOUNT.
Improvement in Machines for Dressing Mill Stones.
No. 119,551. Patented Oct. 3, 1871.
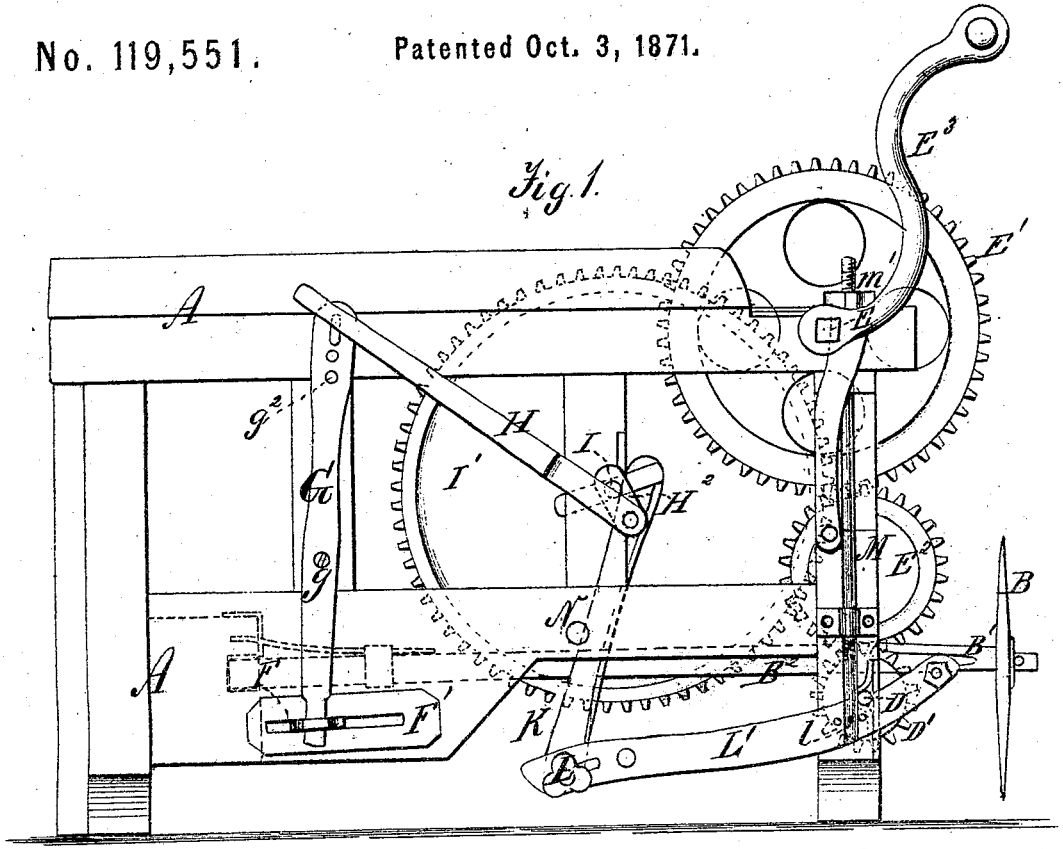
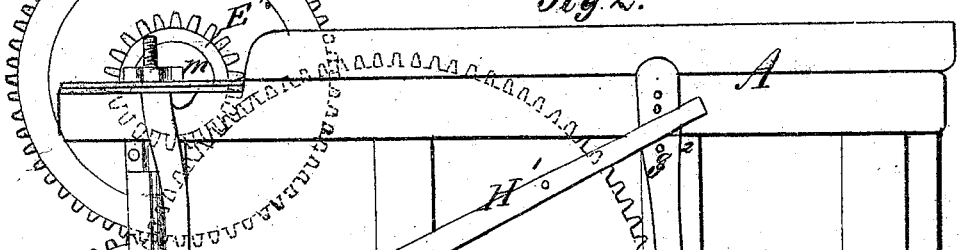

119,551

UNITED STATES PATENT OFFICE.

JOHN I. YOUNT, OF TIPPECANOE CITY, OHIO.

IMPROVEMENT IN MACHINES ROR DRESSING MILLSTONES.

Specification forming part of Letters Patent No. 119,551, dated October 3, 1871.

*To all whom it may concern:*

Be it known that I, JOHN I. YOUNT, of Tippecanoe City, in the county of Miami and State of Ohio, have invented an Improvement in Machines for Dressing Millstones, of which the following is a specification:

This invention relates to a machine for facing, furrowing, and cracking millstones; and my improvements consist: First, in the employment of oscillating picks, to which a horizontal reciprocating motion is imparted at the same time that the length of their arcs of oscillation is gradually changed during each horizontal stroke, whereby the picks are caused to cut an inclined furrow. Second, in providing means for holding the bar which regulates the length of the arc of oscillation of the picks stationary to adapt the machine for facing the stone, and also for cracking the "land" by providing a suitable feed mechanism. Third, in the details of mechanism to be generally explained in the following description and specifically pointed out in the claims.

Figure 1:
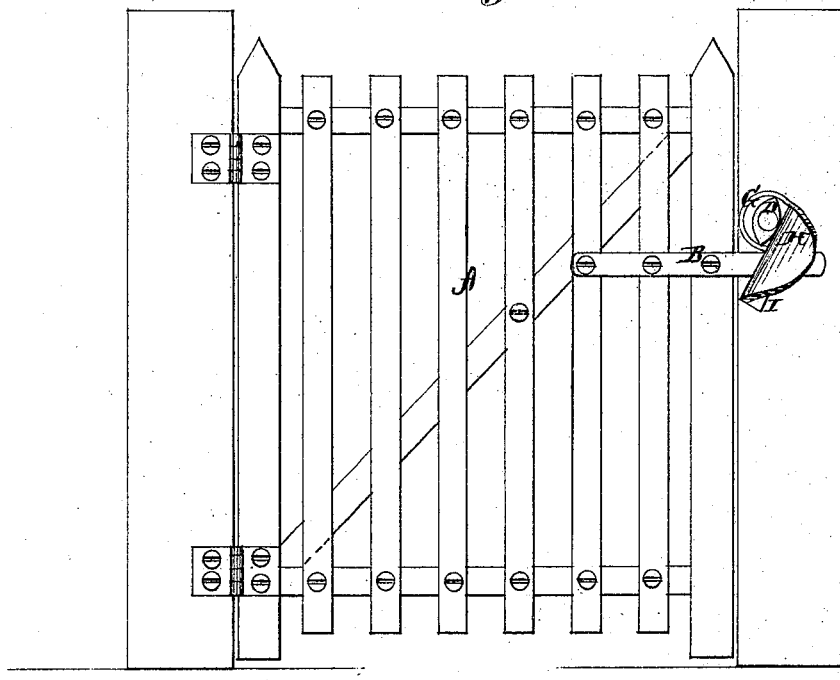
Figure 2:
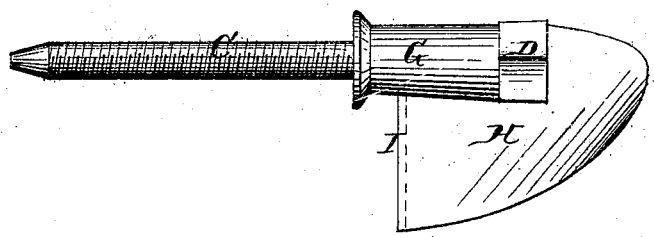

Figure 1 represents a side elevation of my improved machine. Fig. 2 is also a side elevation, illustrating the opposite side. Fig. 3 is a front elevation. Fig. 4 is also a front elevation, the picks being removed to show the lifting mechanism. Fig. 5 is a bottom view. Fig. 6 is a section of a pick and its socket detached.

The same letters of reference are employed in all the figures in the designation of identical parts.

All the operative parts of the machine are mounted upon a suitable frame-work, A, open at the forward end to let the picks B protrude and allow them to go through their compound movements without obstruction. The picks are secured to sockets $B^1$, constructed, by preference, as shown in Fig. 6, where the pick enters a socket, $b$, and is secured to a set-screw, $b'$, so that its point or edge may be readily adjusted to bring it in line with the edges of the other picks. The sockets are secured to the long handles $B^2$, which, extending to the rear end of the frame, are pivoted upon a shaft passing horizontally through the carrier-block C. A mortise is cut transversely through this block for each pick-handle of sufficient height to permit the necessary vibrations of the handles, and the latter are further connected to the block C by flat springs, shown in broken lines in Figs. 1 and 2, which accumulate force as the picks are raised and aid in giving the blow. The picks are oscillated by a compound crank-shaft, D, journaled at each end in suitable boxes on the side timbers of the frame beneath the pick-handles, the crank-shaft being revolved, by a spur-wheel, $E^1$, upon a counter-shaft, E, idle-wheel, $E^2$, and pinion, $D'$, as best seen in Fig. 1. The power is applied to the crank $E^3$ on the counter-shaft E. Each crank of the shaft D operates one pick, and the cranks are so disposed with relation to one another that the picks will strike the blows in two sets and in alternation. Any other arrangement may, however, be adopted. The carrier-block C is firmly connected, by bars $c\ c$, to a cross-head, F, which, projecting at each end through the side timbers of the frame-work, slides in suitable guides $F'$ secured therein, as shown in Figs. 1 and 2. At the overhung ends the cross-head is attached, by a slip-joint, to the short arms of the oscillating levers G $G'$, which are fulcrumed upon the studs $g\ g^1$, respectively, and have in their long arms a series of holes, $g^2$, to one or the other of which the wrist-pins of pitmen H $H^1$ are hitched. These pitmen are connected at the other end to cranks $H^2$ on the overhung ends of a transverse shaft, I, which carries a large spur-wheel, $I^1$, and is revolved through the medium of the latter and a pinion, $E^4$, on the driving-shaft E. The length of the stroke of the cross-head F and carrier-block C may readily be changed by changing the attachment of the pitmen to the oscillating levers from one to another of the series of holes $g^2$. While the mechanism above described for imparting a reciprocating motion to the carrier-block is deemed preferable, yet other means which will readily suggest themselves to a practical mechanic may be employed to obtain this result. The shaft I is cranked at $I^2$ and $I^3$, and at those points rods K and $K'$ are suspended from it which carry at their lower ends a transverse horizontal bar, L. The cranks $I^2$ and $I^3$ are so arranged with relation to the cranks $H^2$ and carrier-block C that when the latter completes a stroke the cranks $I^2$ and $I^3$ will stand vertically below or above, as the case may be, the axis of the shaft I. To the ends of the bar L the oscillating levers $L^1$ and $L^2$ are detachably connected, which, extending forward, turn upon studs $l\ l^1$ secured to vertical slide-rods M and $M'$. The short arms of these levers are connected by a stay-rod, $L^3$, passing from one to the other beneath the

J. H. ALLISON.

Improvement in Latches for Gates and Doors

No. 119,552.  Patented Oct. 3, 1871.

Witnesses: John A. Ellis, G. W. White

Inventor: J. H. Allison

T. H. Alexander, Atty.